(No Model.)
G. FREGA.
TAILOR'S MEASURE.
No. 362,579.   Patented May 10, 1887.
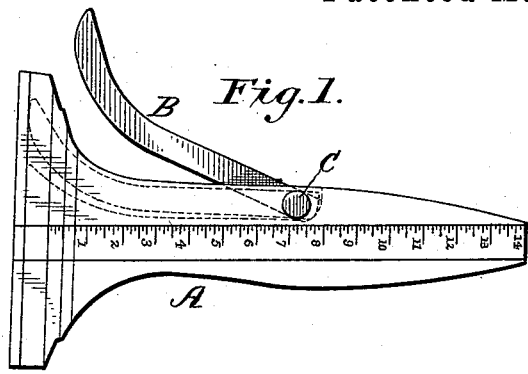
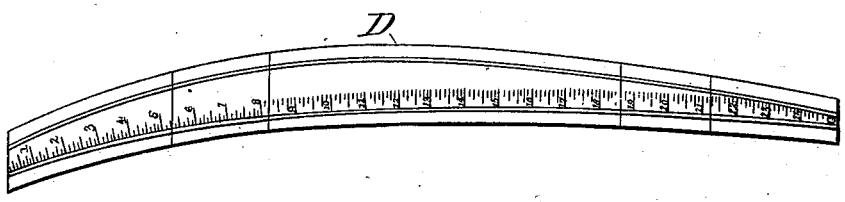
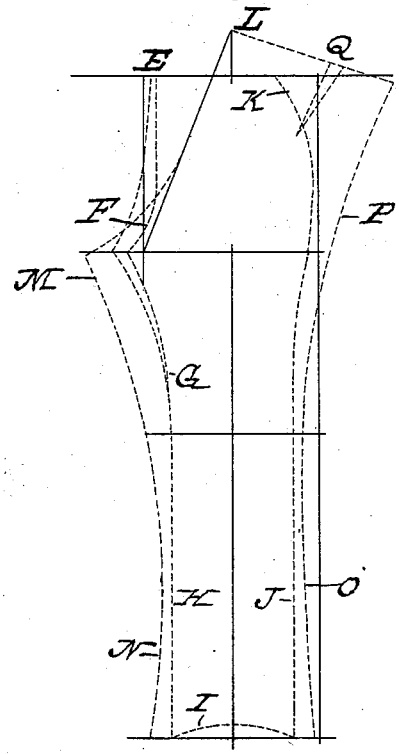
Witnesses.
H. W. Elmore
Fred V. Fischer
Inventor.
G. Frega
By his Attorney.
J. R. Nottingham

United States Patent Office.

GUISEPPE FREGA, OF PHILADELPHIA, PENNSYLVANIA.

TAILOR'S MEASURE.

SPECIFICATION forming part of Letters Patent No. 362,579, dated May 10, 1887.

Application filed December 30, 1885. Serial No. 187,155. (No model.)

*To all whom it may concern:*

Be it known that I, GUISEPPE FREGA, a citizen of the United States, residing at Philadelphia, in the county of Philadelphia and State of Pennsylvania, have invented certain new and useful Improvements in Cutting and Fitting Garments; and I do hereby declare the following to be a full, clear, and exact description of the invention, such as will enable others skilled in the art to which it appertains to make and use the same.

This invention relates to improvements in cutting and fitting garments; and it consists in certain new and useful tools or implements for establishing, in a manner similar to that described in my pending application filed March 10, 1885, Serial No. 158,314, lines corresponding to the particular curves of the human form.

In the accompanying drawings and following description I have illustrated and described my invention as applied to the establishment of the waist-curves and side seams of a pair of pantaloons. It will be evident, however, as stated in the above-mentioned pending application, that the purpose of this invention may have a more general application, changes or modifications being made therein in accordance with the requirements of analogous garment-curves.

In the accompanying drawings like letters indicate like parts throughout the several views.

Figure 1 represents the implement for establishing the waist-curves; Fig. 2, the implement for establishing the outer and inner seams; and Fig. 3 represents, diagrammatically, the method of using the implement.

Referring to Fig. 1, A indicates the main body, made, preferably, of wood, graduated, as shown, and having outside limiting-curves corresponding to those which I have found by experience to define (in most instances) the desired contour for the several pieces from which a pair of pantaloons is constructed.

For extraordinary or exceptional cases met with in different individuals, whose peculiarities of form do not correspond to the normal configuration of the body, I have made provision, by means of the auxiliary arm B, for altering at will the curvature of the waist-fitting implement. This arm B is pivoted by means of a thumb set screw, C, to the main body, and when not in use is secured or received within a rabbet formed in the under side of the main body, as shown in dotted lines.

The letter D indicates the implement for establishing the outer and inner seams of the garment. This implement is also preferably made of wood, properly graduated, and of a curved form best adapted for the purpose for which it is to be used.

In the use of these tools or implements, I first construct upon the pattern-sheet, as represented in Fig. 3 in full lines, the measurements taken from the person, and corresponding, respectively, with the length of the garment, one-quarter of the waist measurement, one-quarter of the thigh measurement, one-half of the knee and bottom measurements. By means of the implements the front section of each pantaloons-leg is laid off upon the pattern-sheet, as represented by the line E, F, G, H, I, J, and K; the rear section thereof being represented by the line L, M, N, O, P, and Q, the implement shown in Fig. 1 being used to establish the lines or seams represented by E, F, L, K, and Q, while the implement shown in Fig. 2 is used to establish the lines or seams represented by G, H, J, M, N, O, and P.

It will be evident that the measurements may be established upon the material itself from which the garment is to be made, instead of the pattern-sheet, thus effecting a saving of time and labor.

Having thus described my invention, what I claim, and desire to secure by Letters Patent, is—

The implement for establishing the waist lines or seams of trousers, consisting of the body A, having curved edges and a scale, and curved arm B, pivoted to said body, and the seam-piece having edges provided with differing curves and with a scale, as and for the purpose specified.

In testimony whereof I affix my signature in presence of witnesses.

GUISEPPE FREGA.

Witnesses:
LISLE STOKES,
FRANCESCO CORTESE,
ANDREA FORTUNATO.